(12) United States Patent
Turner

(10) Patent No.: US 8,985,029 B2
(45) Date of Patent: Mar. 24, 2015

(54) CAR WASH CONVEYOR DOLLY AND METHOD OF MAKING SAME

(75) Inventor: Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 1286 days.

(21) Appl. No.: 12/411,671

(22) Filed: Mar. 26, 2009

(65) Prior Publication Data
US 2010/0242785 A1    Sep. 30, 2010

(51) Int. Cl.
*B60S 3/04*    (2006.01)
*B60S 3/00*    (2006.01)
*C21D 1/18*    (2006.01)
*C21D 1/63*    (2006.01)
*C21D 9/40*    (2006.01)

(52) U.S. Cl.
CPC . *B60S 3/004* (2013.01); *C21D 1/18* (2013.01); *C21D 1/63* (2013.01); *C21D 9/40* (2013.01)
USPC .......................................... 104/162; 104/172.3

(58) Field of Classification Search
USPC ............................. 104/162, 165, 172.1, 172.3
See application file for complete search history.

(56) References Cited

U.S. PATENT DOCUMENTS

| | | | | |
|---|---|---|---|---|
| 4,292,094 A | * | 9/1981 | Kunst et al. | 148/217 |
| H1512 H | * | 1/1996 | Cowan et al. | 148/219 |
| 5,735,971 A | * | 4/1998 | Wahl et al. | 148/217 |
| 6,186,073 B1 | * | 2/2001 | Reitsch, Jr. | 104/172.1 |
| 7,243,605 B1 | * | 7/2007 | Belanger et al. | 104/172.1 |
| 2007/0284223 A1 | | 12/2007 | Belanger et al. | |

FOREIGN PATENT DOCUMENTS

JP    59067364 A  *  4/1984

* cited by examiner

*Primary Examiner* — Mark Le
(74) *Attorney, Agent, or Firm* — Young Basile Hanlon & MacFarlane, P.C.

(57) ABSTRACT

A car wash dolly of the type used in connection with multi-tier car wash conveyors comprises, in mirror image arrangement, first and second pairs of stainless steel journals having external bearing surfaces and polymeric rollers mounted for rotation on said bearing surfaces wherein the journals are nitro carburized and mechanically polished prior to assembly.

14 Claims, 3 Drawing Sheets

CAR WASH CONVEYOR DOLLY AND METHOD OF MAKING SAME

FIELD OF THE INVENTION

My invention relates to car wash conveyor dollies of the type which are linked to an endless loop chain extending along and through a multi tier conveyor structure.

BACKGROUND OF THE INVENTION

In auto laundries, otherwise known as "car washes" it is known to use endless chain conveyors having dollies linked to the chain at regular intervals. The dollies represent an interface between the conveyor chain and the tires of a vehicle such that rollers on the dolly push vehicles along the conveyor by engaging the tread surface of a tire. To function properly, the dollies must have tire engaging rollers as well as track engaging rollers and are linked to the conveyor chain through a slot between conveyor track rails.

Car wash conveyor dollies are described in greater detail in U.S. Pat. No. 4,715,287 issued Dec. 29, 1987 as well as in U.S. Pat. No. 7,302,894, issued Dec. 4, 2007, and the co-pending application Ser. No. 11/765,117 and other applications related to it, said applications and the full disclosures thereof being incorporated herein by reference.

Car wash dollies, by definition, operate in a dirty and corrosive environment. This shortens their operating lives and necessitates occasional rebuilding of the conveyor line.

SUMMARY OF MY INVENTION

According to a first aspect of my invention, I construct a car wash dolly with a combination of cylindrical journals having outside diameter bearing surfaces and suitably sized polymeric rollers rotatably mounted on the journal bearing surfaces for rotation relative thereto. In the preferred form, the journals are constructed of 304 stainless steel and are thereafter structurally altered by a nitro carburizing process and finished by polishing to produce a bearing surface, when mated with the inner diameter surface of a polymeric roller, provides an unexpectedly smooth, durable and wear-resistant bearing surface.

In accordance with the second aspect of my invention, a method of making a car wash dolly includes the steps of forming one or more stainless steel journals, usually in pairs, for later mounting on a suitable axle member, wherein the journals are made of 304 stainless steel and exhibit a radially outermost bearing surface. The journals are pre-heated and immersed in a nitro carburizing salt bath, followed by a lower temperature quenching step, followed by polishing, additional quenching and cooling and rinsing. Thereafter, the journals are assembled with thrust components married to the radial bearing journals and final-assembled by adding polymeric rollers which ride on the nitro carburized and polished bearing surfaces of the journals.

A specific and illustrative example of both aspects of my invention is hereinafter described in detail.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENT

Figure 1:
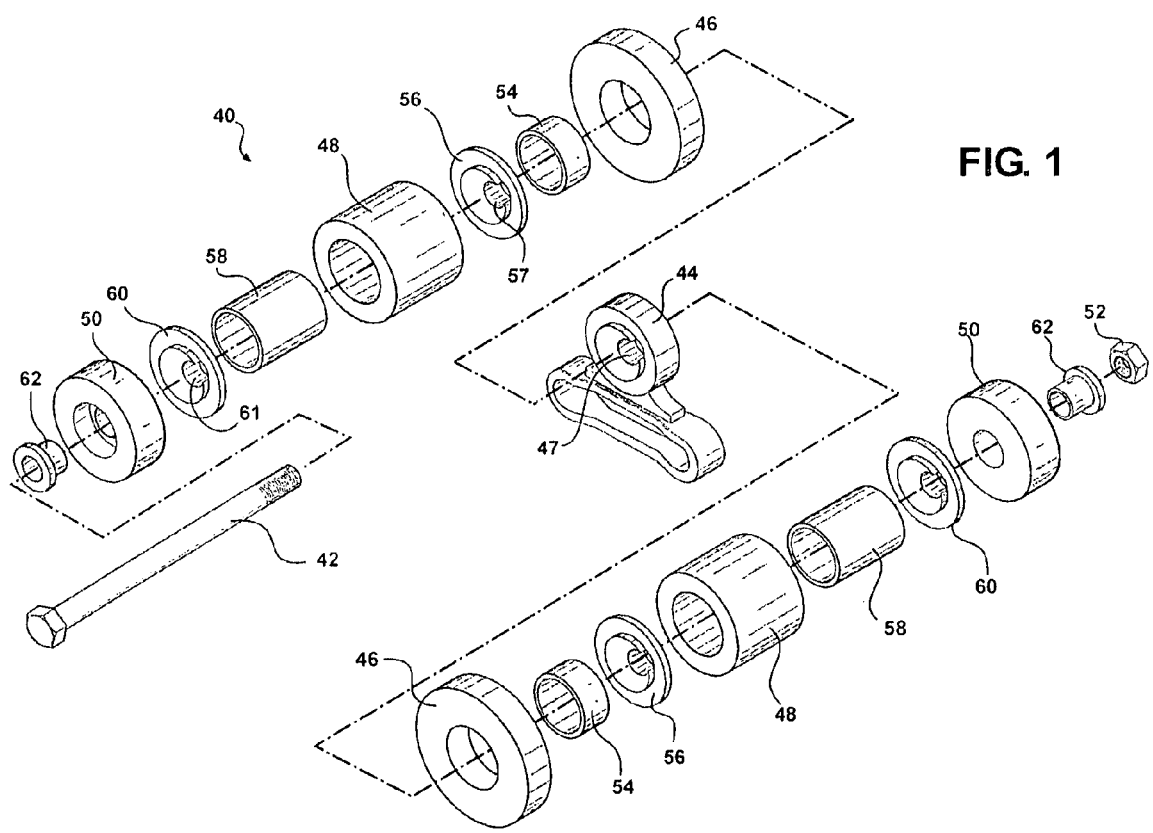
FIG. 1 is a exploded view of a dolly constructed in accordance with my invention.
Figure 2:
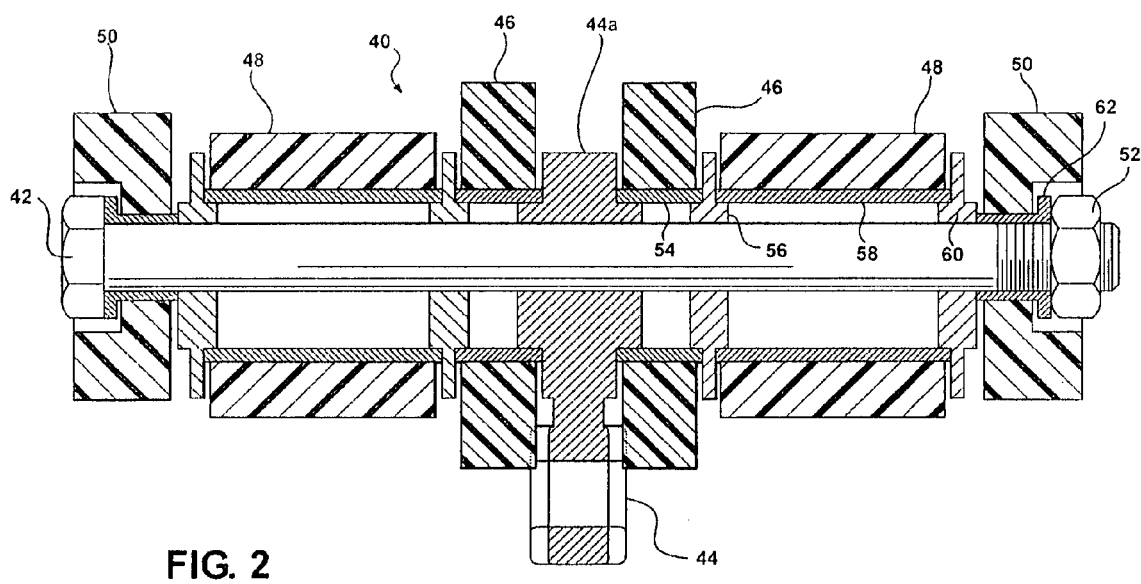
FIG. 2 is a sectional view of the dolly of FIG. 1.

Referring to FIGS. 1 and 2, there is shown a car wash dolly 40 which is designed and adapted to be used in connection with a three tier conveyor structure, more fully described in the aforementioned co-pending application and issued U.S. patent, the disclosures of which are incorporated herein by reference. Each of the dollies 40 comprises a long steel axle member 42 in the form of a steel bolt having a threaded end which receives a nut 52. Mounted on the axle member 42 is a center link 40 which is adapted to be connected to and form a part of an endless loop chain illustrated in FIGS. 3 and 10 of the co-pending application and issued patent. The center link 44 comprises a round, shouldered portion 44a having an eccentric, off center through-hole 47 to receive the axle member 42. The circular portion 44a of the center link provides both radial and thrust bearing surfaces as shown. The overall order of the assembly relative to the center link 44 includes large diameter tire engaging rollers 46 arranged in a reversely similar pair, smaller diameter track engaging rollers 48 mounted outboard of the tire engaging rollers 46 to engage the opposite track rails of the conveyor, and, at the most outboard position, a pair of stabilizing rollers 50 arranged in reversely similar ("mirror image") manner, the entire assembly being held together by means of a nut 52. This is a representative dolly design; the invention may be used with other designs.

As shown in FIG. 1, the tire engaging rollers 46 are mounted on a radial journal 54 which interfits with the shouldered portion 44a of the center link as shown in FIG. 2. The journal 54 interfits with bearing members 56 disposed between the tire engaging rollers 46 and the track engaging rollers 48 and also including an off center through-hole 57 which receives the axle member 42.

A set of radial journals 58 is provided for the track engaging rollers 48 and these journals 58 coact with thrust bearings 60 which are disposed between the track engaging rollers 48 and the outboard stabilizing rollers 50. Holes 61 in the bearing journals 60 are also off center. Bearing members 62 support the stabilizing rollers 50 and the holes through the bearings 62 are on center as opposed to the off center holes 61, 57 in the bearing members 56, 60. As a result of the off center holes 47, 57 and 61 and the elements 44, 56 and 60 and the on center holes in the bearing members 62, the outboard stabilizing rollers, although they are essentially of the same diameter as the rollers 48, sit higher when the dolly 40 is disposed on a conveyor track and do not contact the track surfaces. In addition, as shown in FIG. 2, the rollers 50 at least approximate the radius of the tire engaging rollers 46 at a tangent point of tire contact. In accordance with my invention, bearing elements 54, 56, 58, 60 and 62 are made of 304 stainless steel whereas rollers 46, 50 are made of high density polyethylene such as UHMW and rollers 48 are made of urethane.

Figure 3:
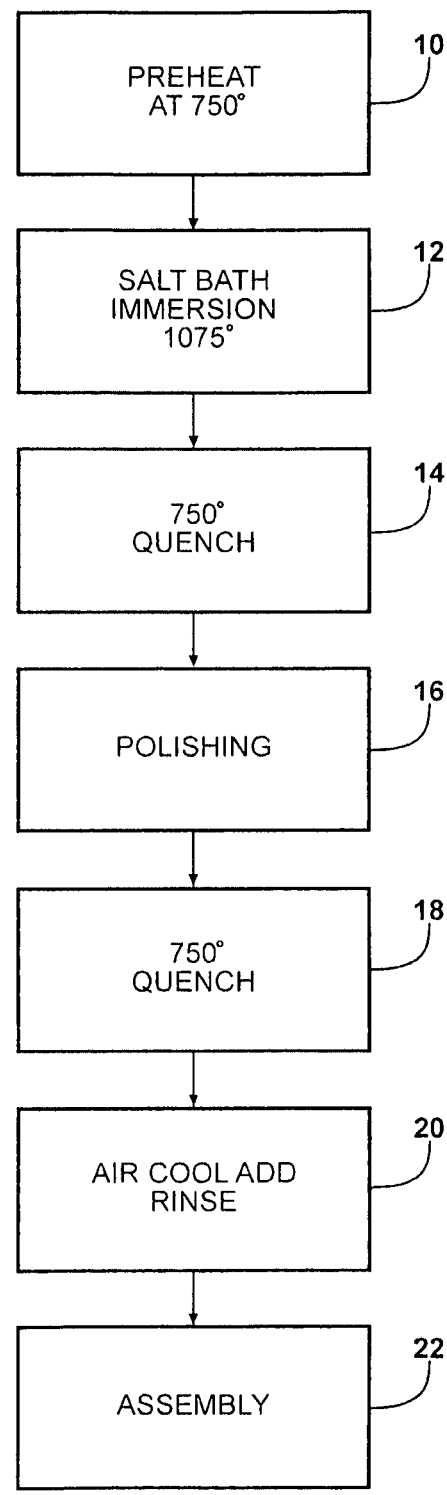
FIG. 3 is a flow chart of a process used to nitro carburize components in the dolly of FIGS. 1 and 2 in accordance with my invention.

Prior to assembly, the 304 stainless steel components are subjected to a nitro carburizing process, the essential steps of which are illustrated in FIG. 3. In step 10, the stainless steel elements, after buffing, are pre-heated in a 750° oven for 15 to 20 minutes. In step 12, the parts are then moved to a Nu-Tride® brand salt bath which is available from the Kolene Corporation of Detroit, Mich. This is a nitro carburizing salt bath which is maintained at a temperature of 1,075°. At step 14, the parts are brought out of the bath and immersed in a Kolene KQ500 salt bath quench maintained at a temperature of 750° (all temperatures specified herein are Fahrenheit). At least the journals 54, 58 are thereafter polished at step 16 by a mechanical vibratory polishing device with an abrasive media. The parts at step 18 are re-immersed in the Kolene KQ500 salt bath quench at 750° Fahrenheit. At step 20 the parts are air cooled and rinsed thoroughly. A lustrous finish can now be observed on the stainless steel parts. The case-hardened portion will be between 0.0006 and 0.0008 inches and may be observed by microscope to see a compound layer of hardness.

Thereafter, the assembly shown in FIGS. 1 and 2 is assembled at step 22. I have found that when this process is closely adhered to, an unexpectedly high quality bearing finish is obtained and the resulting device is resistant to mud, dirt, small gravel and other damaging particulates and will actually begin to polish both the polymeric and stainless steel surfaces and provide an extremely smooth, durable, low friction bearing surface. Of course, the parts 56, 60 and 62 may also be polished as described above to achieve even higher performance levels.

Although my invention has been described with reference to only one type of dolly, it will be understood that the invention is applicable to dollies of various designs using cylindrical bearing journals and polymeric rollers mounted thereon. For a full definition of my invention, reference should be had to the appended claims.

What is claimed is:

1. A car wash conveyor dolly adapted to move along and in rolling relation to a conveyor track comprising:
    an axle;
    at least one pair of cylindrical stainless steel journals mounted on said axle and having external bearing surfaces;
    at least one pair of rollers mounted on said journal surfaces for rotation relative thereto, wherein said journals exhibit a surface structure produced by nitrocarburizing and polishing prior to assembly; and
    wherein the rollers are polymeric.

2. A car wash conveyor dolly as described in claim 1 wherein at least some of the rollers are made of urethane.

3. A car wash conveyor dolly as described in claim 1 wherein at least some of the rollers are made of high density polyethylene.

4. A car wash conveyor dolly adapted to move along and in rolling relationship to a conveyor track comprising:
    an axle having a geometric center;
    in mirror image arrangement about said center, first and second pairs of nitro carburized stainless steel journals having external bearing surfaces; and
    first and second roller of a polymeric roller mounted on said journal surfaces for relative rotation thereto.

5. The car wash conveyor dolly as described in claim 4 wherein at least some of the rollers are made of urethane.

6. The car wash conveyor dolly described in claim 4 wherein at least some of the rollers are made of high density polyethylene.

7. A method making a car wash conveyor dolly comprising at least one pair of cylindrical stainless steel journals having external bearing surfaces and at least one pair of polymeric rollers mounted on said journal surfaces for rotation relative thereto wherein the method comprises the steps of:
    a. preheating the journals to about 750° F.;
    b. nitro carburizing said journals at about 1075° F. to case harden said journals to a depth of about 0.0006 to 0.0008 inches;
    c. quenching the case-hardened journals at about 750° F.;
    d. mechanically polishing the bearing surfaces; and
    e. assembling the rollers to the bearing surfaces.

8. The method defined in claim 7 including the further step of re-quenching the polished journals at about 750° F. prior to assembly.

9. The method defined in claim 7 wherein the quenching step is carried out in a molten salt bath.

10. A car wash conveyor dolly comprising at least one pair of cylindrical stainless steel journals having external bearing surfaces and at least one pair of polymetric rollers mounted on said journal surfaces for rotation relative thereto wherein said dolly is manufactured according to the method steps set forth in claim 7.

11. A car wash conveyor dolly comprising at least one pair of cylindrical stainless steel journals having external bearing surfaces and at least one pair of polymetric rollers mounted on said journal surfaces for rotation relative thereto wherein said dolly is manufactured according to the method steps set forth in claim 8.

12. A method of fabricating a car wash conveyor dolly comprising the steps of:
    a. nitro-carburizing stainless steel journals having cylindrical bearing surfaces at about 1075° F. to case harden said journals to a depth of about 0.0006 to 0.0008 inches;
    b. salt bath quenching the nitro-carburized journals at about 750° F.;
    c. thereafter machine polishing the bearing surfaces of the nitro-carburized and salt bath quenched journals; and
    d. assembling plastic rollers onto the bearing surfaces.

13. A car wash conveyor dolly fabrication method according to claim 12 wherein the method further comprises the step of re-quenching the journals after the mechanical polishing step in a salt bath at about 750° F.

14. A car wash conveyor dolly fabrication method according to claim 12 including the further step of integrating the assembled journals and rollers with additional dolly components including a roller axle such that the dolly is adapted to travel along a car wash conveyor track.

\* \* \* \* \*